United States Patent [19]
Van Etten

[11] Patent Number: 5,332,009
[45] Date of Patent: Jul. 26, 1994

[54] PRESSURIZED CANISTER RECYCLING APPARATUS AND METHODS

[76] Inventor: Larry W. Van Etten, 124 Cherry La., Tampa, Fla. 33610

[21] Appl. No.: 95,881

[22] Filed: Jul. 22, 1993

[51] Int. Cl.$^5$ .............................................. B65B 31/00
[52] U.S. Cl. ...................................... 141/7; 422/900; 100/902; 141/65; 141/329; 141/51; 222/397; 222/86; 222/83.005; 222/87
[58] Field of Search ................ 141/51, 65, 329, 330, 141/7, 98; 222/83.5, 81-83, 85, 86, 87, 397; 100/902; 422/900

[56] References Cited

U.S. PATENT DOCUMENTS

| | | | |
|---|---|---|---|
| 4,349,054 | 9/1982 | Chipman et al. | 141/1 |
| 4,407,341 | 10/1983 | Feldt et al. | 141/97 |
| 4,459,906 | 7/1984 | Cound et al. | 100/902 X |
| 4,690,180 | 9/1987 | Gold | 141/51 |
| 4,944,333 | 7/1990 | Gold et al. | 141/51 |
| 5,067,529 | 11/1991 | Gonzalez-Miller et al. | 141/7 |
| 5,114,043 | 5/1992 | Collins, Jr. | 222/86 |
| 5,163,483 | 11/1992 | Eckman | 141/1 |
| 5,163,585 | 11/1992 | Campbell | 141/65 X |
| 5,174,344 | 12/1992 | Gonzalez-Miller | 141/65 |
| 5,181,462 | 1/1993 | Isaac | 100/98 R |
| 5,186,219 | 2/1993 | Gold et al. | 141/51 |

*Primary Examiner*—Ernest G. Cusick
*Attorney, Agent, or Firm*—Dykema Gossett

[57] ABSTRACT

A pressurized canister recycling apparatus is used to recycle contents of a plurality of pressurized canisters of varying length and diameter. The canisters are maintained in a hopper and released. The canisters are pushed into a canister piercing station where they are pierced while isolated from the outside environment. After being pierced and while still isolated from the outside environment, the canisters travel within an evacuation tank. The evacuated contents of the canisters are drawn away from the evacuation tank with filters recovering the active ingredients of the canisters and purifying the propellant. The propellant is then placed in a storage tank. The present invention is particularly useful for recycling medicinal Freon ingested into the body since the Freon recovered does not require additional purification before reuse.

25 Claims, 5 Drawing Sheets

PRESSURIZED CANISTER RECYCLING APPARATUS AND METHODS

BACKGROUND OF THE INVENTION

The present invention relates to a pressurized canister recycling apparatus for use in recovering the contents of a plurality of pressurized canisters of varying length and diameter.

Canisters are usually incinerated or buried in land fills, resulting in the waste of valuable resources, the release of ozone depleting chlorofluorocarbons ("CFCs") and hydrochlorofluorocarbons ("HCFCs") such as Freon into the environment, and in the case of insecticides, the unwanted spread of poisons. Incineration of such canisters has also been the source of more immediate danger since the canisters typically explode when subjected to elevated temperatures.

Devices are known for emptying pressurized canisters. Such devices, however, do not have the ability to recover and recycle canister contents, including active ingredients and propellant, for canisters of varying lengths and with differing diameters using a continuously fed apparatus. Nor do such devices have the ability to recycle Freon, particularly medicinal Freon for ingestion into the body, without requiring additional purification.

SUMMARY OF THE INVENTION

A pressurized canister recycling apparatus is used to recycle contents of a plurality of pressurized canisters of varying length and diameter, wherein the contents include active ingredients and a propellant such as medicinal Freon.

The canisters are manually placed in a hopper and are selectively released into a vibrating bowl that receives and orients the canisters. The canisters then travel down a gravity based escapement track where they are fed one-by-one into a two-bore rotator. Sensors on the escapement track indicate when additional canisters are needed in the track and if there is a problem with either the hopper or vibrating bowl. Once a canister is fed into a bore of the rotator, a canister restriction device prevents additional canisters in the escapement track from interfering with the rotator's operation. The rotator is rotated to position the canister fed from the escapement track in front of a ram.

Using the ram, canisters are pushed into a seal block assembly, advancing canisters already in the assembly. A piercing station and evacuation tank are disposed between two such assemblies, to isolate the canisters from the outside environment. The seal block assemblies are comprised of a plurality of spaced seal blocks with seals that surround an outer circumference of the canisters. The seal block are able to accommodate canisters of varying length and diameter, while performing their isolating function.

A canister is advanced from a seal block assembly into the piercing station, where the canister is pierced so that its contents may be evacuated. Then the canisters are evacuated as they travel through an evacuation tank. A vacuum is created via a tank tap within the tank to draw the contents of the canisters from the tank and into a filter. The filter recovers the active ingredients of the canisters and purifies the propellant that passes through. The propellant passes through a compressor and is stored in a storage tank.

Finally, the evacuated canisters leave the evacuation tank via a seal block assembly where the canister's body may be separated from its nozzle unit.

A single hopper, vibrating bowl, and evacuation tank may be used for a plurality of escapement tracks, rotators, and seal block assemblies, allowing the present invention to efficiently recycle the components of a large number of such canisters. This is of particular importance to pressurized canister manufacturers who need to address recycling issues pursuant to defective merchandise as well as to landfill and incinerator operators.

BRIEF DESCRIPTION OF THE DRAWINGS

The features and inventive aspects of the present invention will become more apparent upon reading the following detailed description, claims, and drawings, of which the following is a brief description:

DESCRIPTION OF PREFERRED EMBODIMENTS

Figure 1:
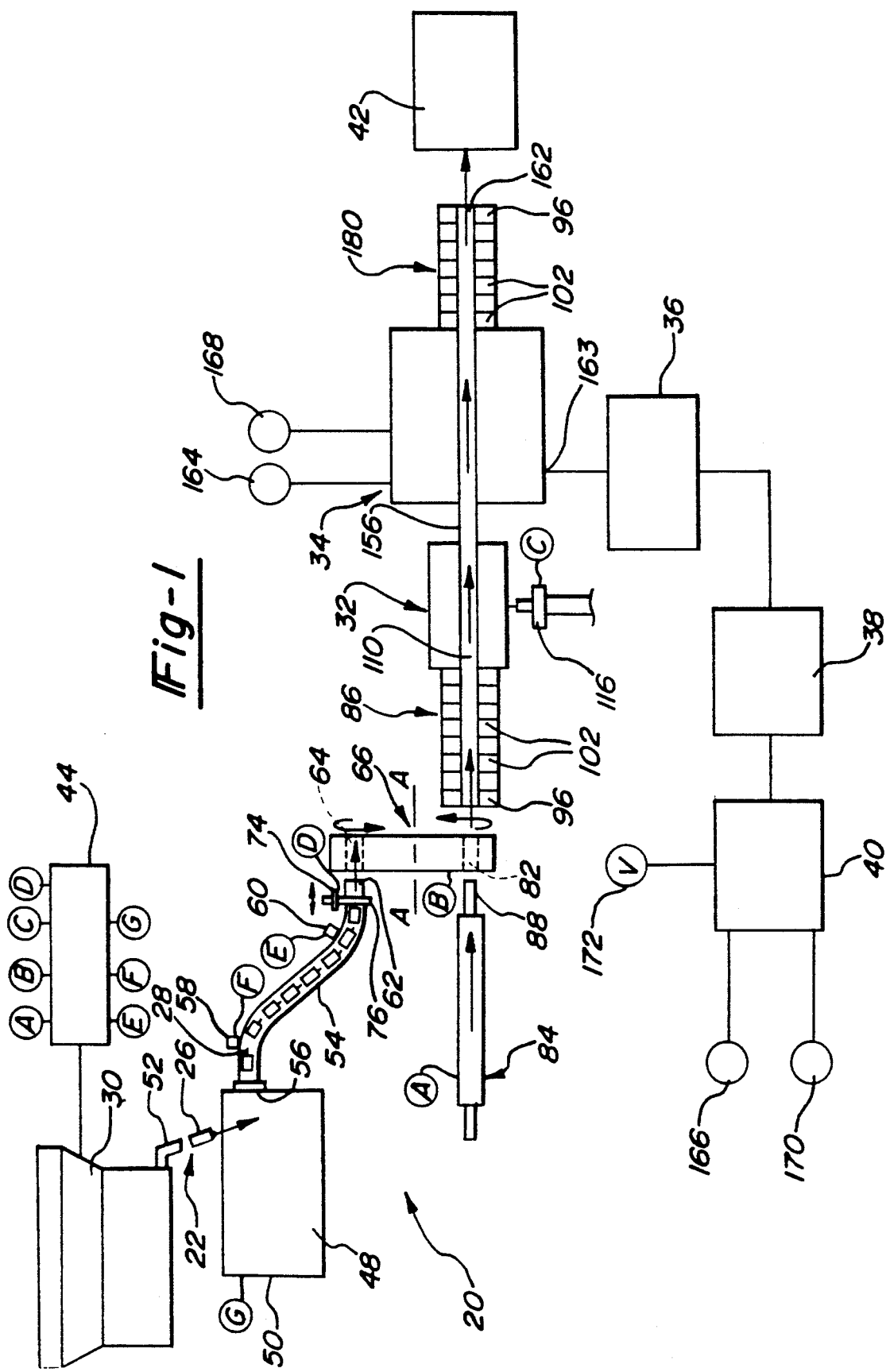
FIG. 1 is a schematic of an embodiment of the present invention.

A pressurized canister recycling apparatus 20 for use in recovering the contents of a plurality of pressurized canisters 22 of varying length and diameter is shown in FIG. 1. Apparatus 20 evacuates, captures, filters, and stores both the active ingredients and the propellant of each canister 22 while isolated from an outside environment.

In the disclosed embodiment, canisters 22 are ampules for use in treating breathing disorders such as asthma. Having a metal body 26 of high grade aluminum, and a plastic nozzle unit 28, the length of a canister 22 depends on the number of doses of medication contained within each canister. Canisters 22 are known that have 80, 160, and 200 dosages of medicine. The medication is pressurized using a medicinal grade Freon that may be ingested by a patient.

In general, the canisters 22 are maintained in a hopper 30 and continuously released. One-by-one, the canisters 22 are pushed into a canister piercing station 32 where they are pierced while isolated from the outside environment. After being pierced and while still isolated from the outside environment, the canisters travel within an evacuation tank 34 that evacuates the contents of each canister 22. The contents, comprising active ingredients and propellant, are drawn away from the evacuation tank 34 through filters 36 that recover the active ingredients. The purified propellant, such as Freon, passes through a condenser/compressor 38, to be stored in a storage tank 40. Using the present invention, virtually none of the propellant is released into the outside environment. Thus, apparatus 20 meets Environmental Protection Agency regulations that permit only 5% of the Freon collected during a recovery operation to be released into the atmosphere. Finally, the evacuated canisters 22 leave evacuation tank 34, where a detapper 42 may be used to separate the metal body 26 from the nozzle unit 28. As would be understood by those skilled in the art, the operation of apparatus 20 is directed and monitored by a central controller 44 such as a computer.

Canisters 22 are manually placed in hopper 30. Using a paddle switch 48, associated with a vibrating bowl 50, canisters 22 are released down a chute 52 of hopper 30 into vibrating bowl 50. Additional canisters 22 are only released down chute 52 when paddle switch 48 does not move because of a lack of canisters 22 within vibrating bowl 50.

Vibrating bowl 50 maintains an adequate supply of canisters 22 in a gravity based escapement track 54, and orients canisters 22 so that the nozzle unit 28 of each canister 22 descends first from bowl 50 into top opening 56 of escapement track 54. A light beam based sensor 58 is positioned approximately one-third of the way down escapement track 54. Sensor 58 is designed to react to blocked or unblocked conditions resulting from the presence of a canister 22. When light is not blocked by a canister 22, sensor 58 activates vibrating bowl 50 so that additional canisters may enter escapement track 54. A second sensor 60 is positioned near the bottom of the escapement track 54. When sensor 60 is unblocked, a signal is sent by sensor 60 to controller 44 to indicate that there is most likely a jam within vibrating bowl 50, or hopper 30 is empty.

Figure 2:
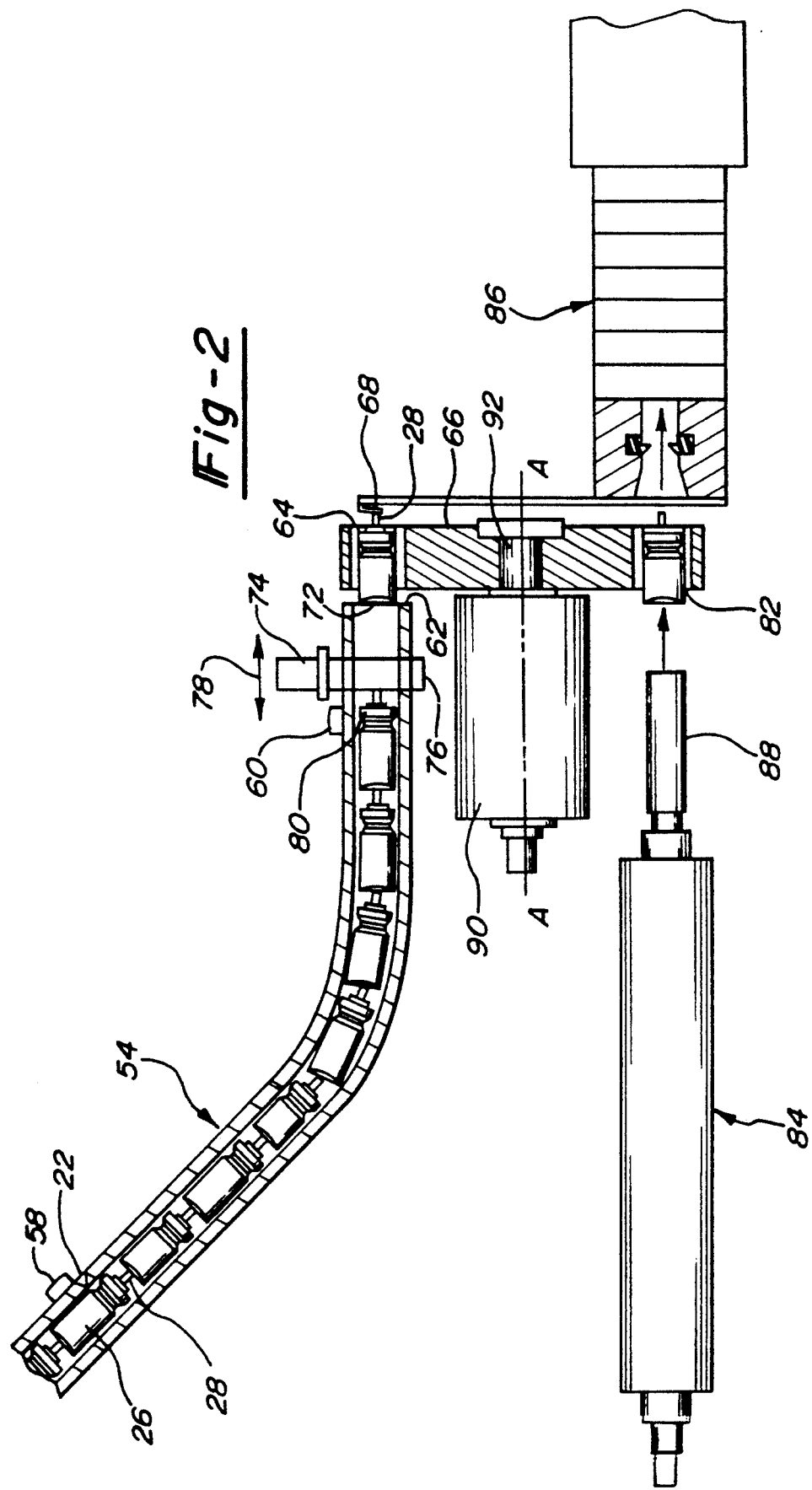
FIG. 2 is a partial cross-section of a portion of the present invention highlighting the use of a rotator and ram.

As illustrated in FIG. 1, and in greater detail in FIG. 2, escapement track 54 transfers the canisters 22 from vibrating bowl 50 to an annular rotator 66. A bottom opening 62 of escapement track 34 lines up with a bore 64 of the annular rotator 66. The force of gravity resulting from the plurality of canisters within escapement track 54 feeds a first canister 22 at opening 62 into bore 64. Nozzle unit 28 hits a stop 68 that prevents further feeding of the first canister 22. Simultaneously, the nozzle unit 28 of a second canister 22 rests in the concave bottom 72 of the first canister 22. To prevent the second canister 22 at opening 62 from hindering the rotation of rotator 66 about axis A—A, controller 44 instructs a pancake cylinder 74 with two fingers 76 to grab and move the second canister 22 along a path 78 running parallel to the bottom 80 of escapement track 54 and away from bore 64. Thus, using such a canister retraction device, the nozzle unit 28 of the second canister 22 no longer rests in the concave bottom 72 of the first canister to interfere with the operation of rotator 66. The escapement track 54 includes the necessary openings so that fingers 76 may grab and move the second canister 22.

While the first canister 22 is fed into bore 64, a canister 22 has already been fed into a second bore 82 of rotator 66 that is positioned 180 degrees away from bore 64. Controller 44 activates a hydraulic ram 84 to push the canister 22 within bore 82 into an annular seal block assembly 86. Ram 84 includes a rod 88 that has a diameter less than that of bores 64 and 82, and a length sufficient to push a canister 22 completely out of either bore into seal block assembly 86. The pushing of the canister 22 into seal block assembly 86 advances other canisters 22 that are already within assembly 86.

When the first canister 22 in escapement track 54 has been correctly fed into bore 64, the second canister 22 in the escapement track 54 moved away from bore 64, and the canister 22 in bore 82 pushed into seal block assembly 86, a motor 90 with a shaft 92 secured to rotator 66 is activated by controller 44 to rotate rotator 66 about axis A—A. Bore 64 is rotated to the position previously occupied by bore 82, and bore 82 is rotated to the position previously occupied by bore 64. Then the second canister 22 is fed into bore 82, and the first canister 22 pushed by hydraulic ram 84 into seal block assembly 86. The described process is continuously repeated such that with each rotation of rotator 66, a canister 22 is pushed into seal block assembly 86 and the canisters 22 already within assembly 86 are advanced further within apparatus 20. Approximately 40 to 60 canisters may be fed into seal block assembly 86 per minute.

Seal block assembly 86 isolates canisters 22 from the outside environment because of a seal created about an outer circumference of canisters 22 within the assembly. Assembly 86 comprises a plurality of individual seal blocks that are positioned at set distances from one another to ensure a continuous seal from the outside environment despite the diameter or length of a canister 22. As illustrated in FIG. 1, and in greater detail in FIG. 3, eight seal blocks are preferably used to insure that there is always a sufficient seal around the outer circumferences of least two of the canisters within seal block assembly 86. Seals 94 are disposed if needed between the seal blocks of seal block assembly 86 to prevent communication between the canisters 22 and the outside environment. In general, the seal blocks have a sufficiently tight tolerance so that seals 94 are not required.

A canister 22 enters a first seal block 96 that includes a bore 98 with a diameter greater than a corresponding diameter of a canister 22. Seal block 96 is preferably formed from metal and machined to replaceably secure a wiper seal 100 that extends radially inwardly of bore 98 to engage the circumference of canisters 22 to provide a desired seal. Wiper seal 100 prevents blow back of the canister under certain pressure conditions. Thus, each canister 22 that enters seal block assembly 86 is constrained from escaping at the point of entry. After leaving seal block 86, a canister 22 passes through a plurality of seal blocks 102 that include a bore 104 with a diameter greater than a corresponding diameter of a canister 22. Seal blocks 102 are preferably formed from metal and machined to replaceably secure a Teflon type seal 106 that extends radially inwardly of bore 104 to engage the circumference of canisters 22. Teflon type seals are desirable because of their resistance to propellants such as Freon, long life and memory. Once a Canister is pushed through a seal 106, the seal returns to its original position. Traditional seals, particularly those comprising rubber, are incompatible with propellants such as Freon, resulting in rapid seal deterioration. In the illustrated embodiment, canisters 22 typically have a diameter between ⅞ in. (22.2 mm) and 15/16 in. (23.8 mm), although bores 104 and seals 106 are designed to safely encompass canisters 22 with a diameter ranging between 11/16 in. (17.5 mm) and 15/16 in. (23.8 mm).

With the addition of a canister 22 into seal block assembly 86 for each rotation of rotator 66 about axis A—A and the activation of ram 84, canisters 22 are pushed through seal block assembly 86, into a receiving bore 110 of piercing station 32. A canister 22 within piercing station 32 is effectively isolated from the outside environment. In the disclosed embodiment, a sensor 112 is placed adjacent bore 110 to determine when a canister 22 is present within the bore. Sensor 112 includes a filter and reacts to the specular reflection of aluminum. When a canister 22 is within bore 110, the sensor voltage changes between 0.7 and 0.8 volts. Piercing station 32 includes an aperture 114 perpendicular to bore 110. A hydraulic pin assembly 116 is sealed to aperture 114 using a cowl 118. When a canister 22 is correctly positioned within bore 110, hydraulic pin assembly 116 is activated with a hydraulic pin 120 piercing metal body 26 of a canister 22. A plurality of such hydraulic pin assemblies 116 may be used to puncture holes in canister 22.

Figure 4:
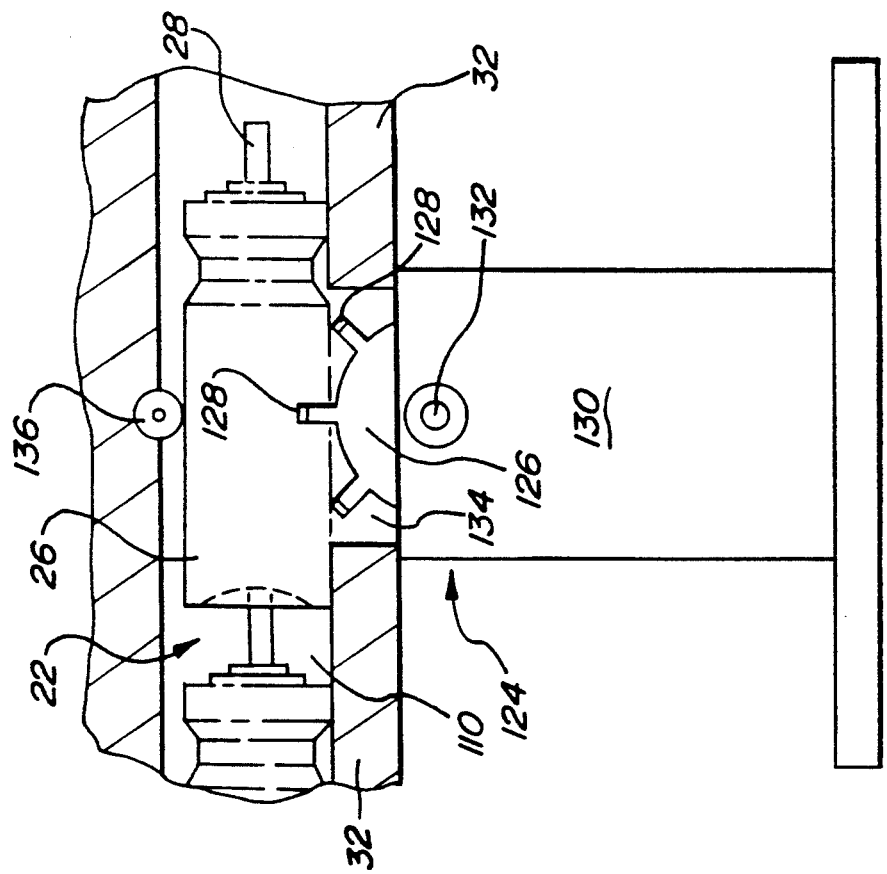
FIG. 4 is a schematic illustrating an embodiment of a star wheel assembly for use in a piercing station according to the present invention.

The contents of a canister 22 may coat and reduce the accuracy of sensor 112. Additionally, the type of punctures made by hydraulic pin assemblies 116 may result in an inability to evacuate all of the contents from the canister 22. Further, binding occasionally results when using several hydraulic pin assemblies 116. Therefore, as illustrated in FIG. 4, an alternative embodiment of the present invention includes a star wheel assembly 124. Sealed from the outside environment, star wheel assembly 124 includes a stainless steel wheel 126 with points 128 that is secured to a pedestal 130 about pivot point 132. Piercing station 32 includes a slot 134 to receive wheel 126 such that as a canister 22 passes through bore 110, the canister passes over radially inwardly extending points 128. Points 128 puncture metal body 26 in several locations without binding and allow the evacuation of all of the contents from a canister 22. A concave face cylindrical roller 136 extends radially inwardly of bore 110 at a position opposite slot 134 and forces the metal body 26 of the canister 22 onto points 128 of star wheel 126.

Figure 5:
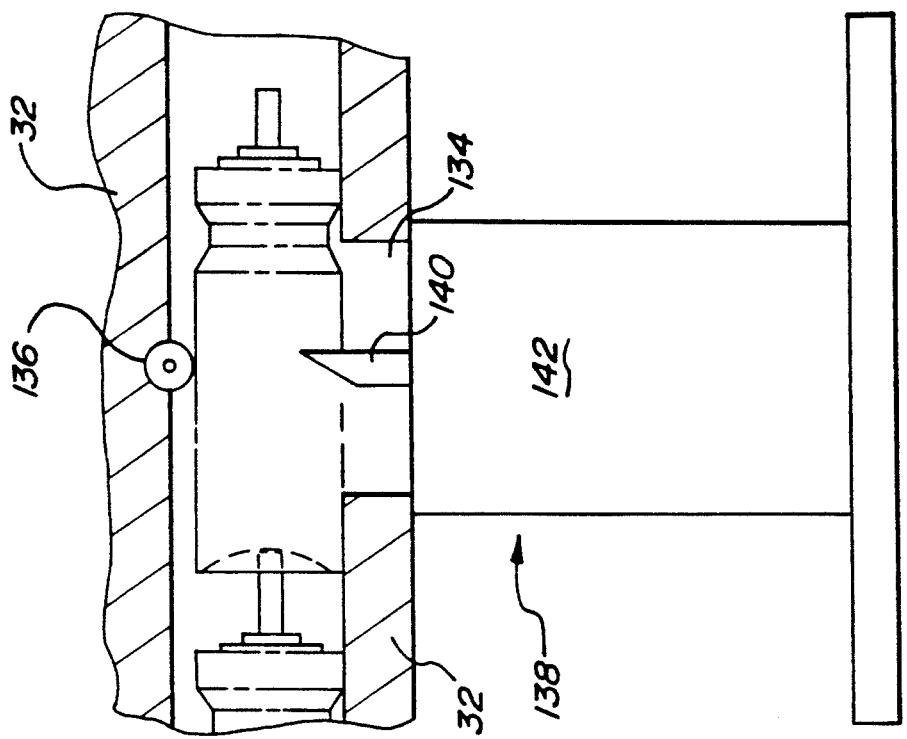
FIG. 5 is a schematic illustrating an embodiment of a wedged knife assembly for use in a piercing station according to the present invention.

A second alternative embodiment for piercing the metal bodies 26 of canisters 22 is illustrated in FIG. 5. Roller 136 serves the same function as discussed with respect to FIG. 4. However, a wedged knife assembly 138 is used. Sealed from the outside environment, wedge knife assembly 138 preferably includes a stainless steel wedged knife 140 that is secured to a pedestal 142. Knife 140 passes through slot 134 and extends radially inwardly of bore 110. As canisters 22 are pushed through bore 110 of piercing station 132, knife 140 splits metal body 26 without binding to allow complete evacuation of canister contents.

Figure 3:
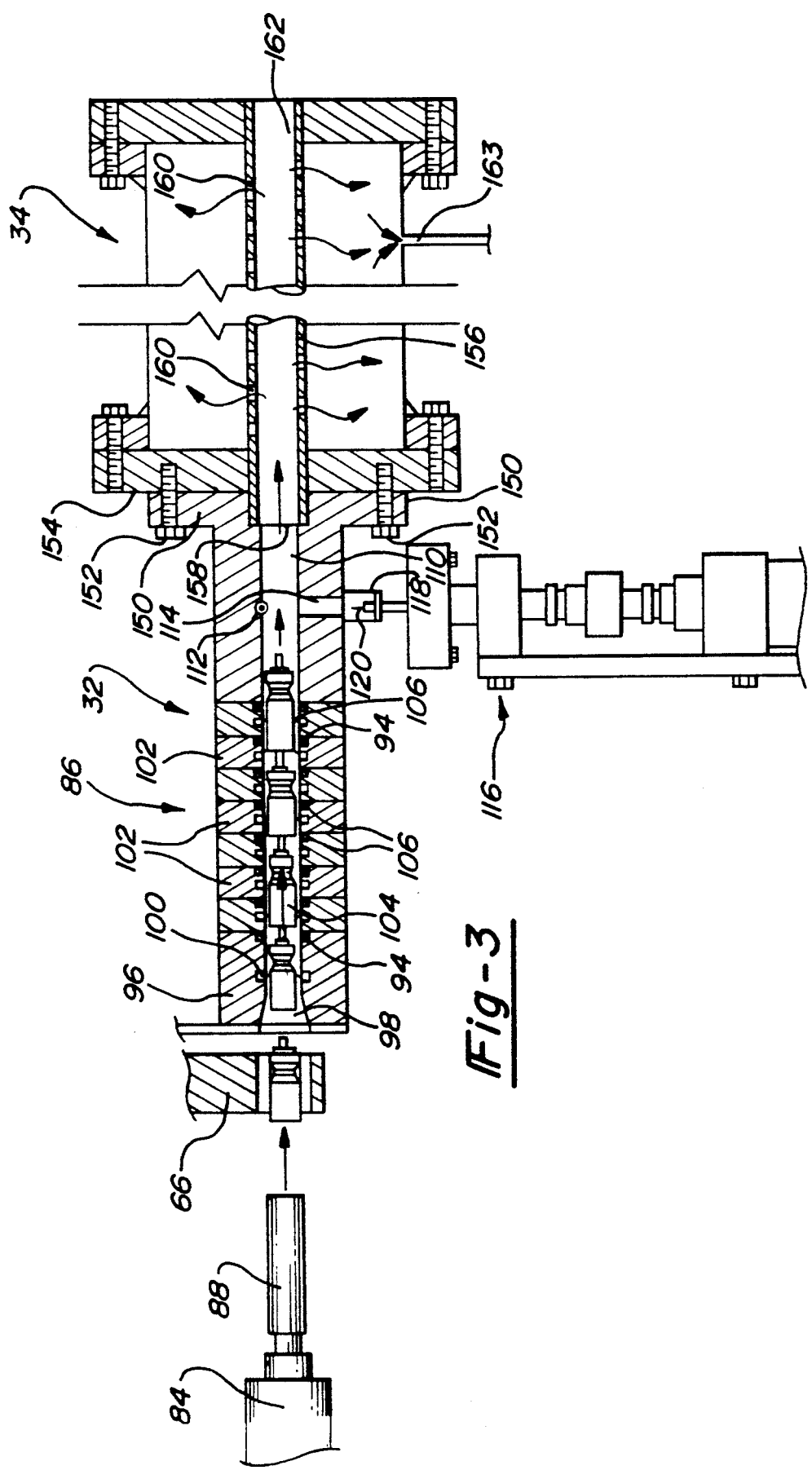
FIG. 3 is a partial cross-section of a portion of the present invention highlighting the use of a seal block assembly, a hydraulic pin assembly and an evacuation tank.

As shown in FIG. 1, and illustrated in greater detail in FIG. 3, canisters 22 pass from piercing station 32 into evacuation tank 34 where they are still isolated from the outside environment. In the illustrated embodiment, piercing station 32 includes two flanges 150 adapted to receive bolts 152 that are screwed into a mating surface 154 of evacuation tank 34. A pipe 156 with an inlet end 158 extends outwardly of evacuation tank 34 into piercing station 32 and is aligned with bore 110 to provide a path for canisters 22 to follow. An inner diameter of pipe 156 roughly corresponds to the diameter of bore 110 and is approximately one inch (25.4 mm).

Pipe 156 includes a plurality of slots 160 to allow the canister contents to be evacuated. The length of the tank is chosen so that the evacuation process may be completed before the canisters reach outlet end 162 of pipe 156. In a preferred embodiment, the tank extends approximately 10 feet.

A slight vacuum is applied to tank 34 and indirectly to piercing stations 32 via a tank tap 163 using condenser/compressor 38 to help evacuate canisters 22 and to draw the evacuated contents into filters 36. Filters 36 only allow particles less than 1 μm through. Therefore, the active ingredients are recovered by filters 36, but the propellant continues through condenser/compressor 38 and into storage tank 40. The present invention is particularly advantageous for the recycling of medicinal Freon from ampules used to treat breathing disorders such as asthma. The Freon stored in storage tank 40 is extremely pure, and may be reused without requiring additional purification. This is of particular importance when the Freon will be ingested into a body.

In a preferred embodiment, the vacuum is between 0.5 in. and 1 in. below ambient pressure, although apparatus 20 will work with up to 5 inches of vacuum. While a lower pressure promotes efficiency, the vacuum must be carefully controlled. Otherwise, canisters 22 may blow back through seal block assembly 86 despite the presence of wiper seal 100. When a canister 22 is punctured, the pressure within the evacuation tank 34 rises for just an instant, but already promotes a tendency for canisters 22 to blow back through seal block assembly 86.

Both evacuation tank 34 and storage tank 40 have a plurality of gauges. Gauges 164 and 166 measure pressure while gauges 168 and 170 measure temperature. The temperatures and pressures within evacuation tank 34 and storage tank 40 are continuously monitored by controller 44 and compared to a standard curve. When too much air is pulled into storage tank 140, in part because canisters 22 trap atmospheric air when pushed into seal block assembly 86, the pressure of tank 40 rises. At a critical value, some of this air is bled off using valve 172 at the top of storage tank 40. Since a propellant such as Freon is heavier than atmospheric air, none of the propellant escapes into the environment.

In addition to pressure and temperature, the moisture content of atmospheric air may vary. However, filters 36 trap moisture when trapping the active ingredients from the canisters 22. If desired, the active ingredients may then be recycled by removing them from filters 36 as is known to those skilled in the art. Alternatively, filters 36 may be disposed off in a manner that is environmentally safe. Filters 36 are replaced when the pressure, as measured by gauge 164, falls below a threshold value such as 0.5 inches of vacuum.

Figures 6, 7:
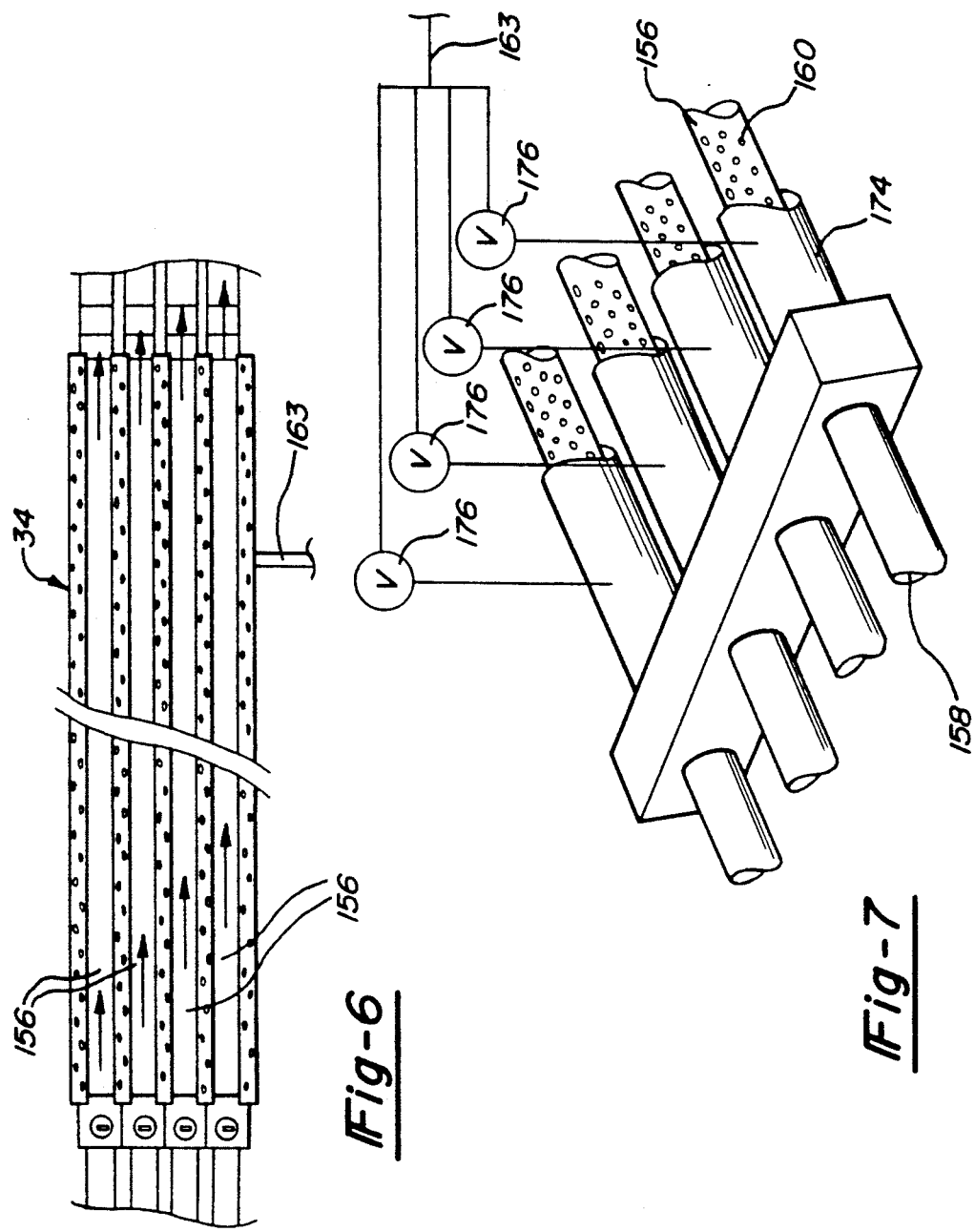
FIG. 6 is schematic top view of a multi-pipe evacuation tank according to the present invention.
FIG. 7 is a perspective view of an alternative embodiment of an evacuation tank according to the present invention.

As shown in FIG. 6, evacuation tank 34 may support a plurality of pipes 156. In practice, a single hopper 30, vibrating bowl 50, and evacuation tank 54 may be used for plurality of escapement traps 54, rotators 66, and seal block assemblies 86, allowing the present invention to efficiently recycle the components of a large number of canisters 22. This is of particular importance to pressurized canister manufacturers who need to address recycling issues pursuant to defective merchandise as well as to landfill and incinerator operators. In practice, it has been found desirable to use one hopper 30 and one vibrating bowl 50 for two escapement tracks 54 and related components.

If maintenance is required or a problem occurs with one of the pipes 156 in evacuation tank 34, the entire apparatus 20 must be shut down. This problem is overcome using an alternative embodiment illustrated in FIG. 7. Pipes 156, including inlet end 158, are the same as discussed above. However, a tube 174 surrounds each individual pipe 156 and acts as an evacuation tank. Tube 174 includes a valved tap 176 that places the pipes 156 under a vacuum as discussed above and directs the contents of canisters 22 to filters 36. If a problem results with one of the pipes 156, however, valved tap 176 may be used to isolate that pipe from the other three pipes so that apparatus 20 does not have to completely shut down.

As illustrated in FIG. 1, once outlet end 162 of pipe 156 is reached, canisters enter a seal block assembly 180 that is virtually identical to seal block assembly 86 discussed above with respect to FIG. 3. However, seal block 96 with wiper seal 100 is positioned after a plurality of seal blocks 102 with Teflon type seals 104. Fewer seal blocks 102 may be required for seal block assembly 180 than for seal block assembly 86. Once a canister 22 passes through seal block assembly 180, it is no longer isolated from the outside environment. The canister 22 may enter detapper 42 where nozzle unit 28 is separated from metal body 26 so that both may be recycled.

Preferred embodiments of the present invention have been described. It is to be understood that variations and modifications may be employed without departing from the scope of the present invention. Accordingly, the following claims should be studied to learn the true scope of the present invention.

I claim:

1. A method for recycling contents of a plurality of pressurized canisters, comprising the steps of:
    releasing the canisters from a hopper;
    feeding the canisters to a rotator;
    moving the canisters from said rotator, advancing the canisters with each said moving step;
    isolating the canisters from an outside environment;
    opening the canisters after said isolating step; and
    evacuating the canisters after said opening step.

2. A method as recited in claim 1, further comprising the step of rotating said rotator after said feeding step to position the canisters in front of a ram.

3. A method as recited in claim 1, further comprising the step of orientating the canisters using a vibrating bowl after said releasing step.

4. A method as recited in claim 1, wherein said evacuating step comprises the sub-steps of:
    drawing the contents of the canisters through a tank tap;
    recovering the active ingredients of the canister from the propellant using a filter; and
    storing the propellant in a storage tank.

5. A method as recited in claim 4, wherein said evacuating step includes the sub-step of applying a vacuum to said evacuation tank via said tank tap.

6. A method as recited in claim 5, further comprising the steps of:
    measuring pressure and temperature differences between said evacuation tank and said storage tank; and
    bleeding off atmospheric air from said storage tank when a threshold pressure and temperature is reached.

7. A pressurized canister recycling apparatus for use in recycling contents of a plurality of pressurized canisters, wherein the apparatus comprises:
    a hopper that holds and releases the canisters;
    a rotator for receiving the canisters;
    an escapement track that transfers the canisters released by said hopper and feeds the canisters to said rotator;
    at least one seal block assembly that defines a space to receive the canisters and which is adapted to isolate the canisters from an outside environment;
    a ram that moves the canisters from said rotator into said seal block assembly;
    a station for opening each of the canisters; and
    an evacuation tank which receives the contents of each of the canisters after the canisters have been opened at said station.

8. An apparatus as recited in claim 7, further comprising a vibrating bowl that receives and orients the canisters released by the hopper.

9. An apparatus as recited in claim 7, further comprising a tank tap within said evacuation tank to draw the contents of the canisters from said evacuation tank.

10. An apparatus as recited in claim 9, further comprising a compressor to create a vacuum in said evacuation tank via said tank tap.

11. An apparatus as recited in claim 10, further comprising a filter disposed between said tank tap and said compressor, said filter used to separate active ingredients of the canisters from canister propellant.

12. An apparatus as recited in claim 11, wherein only particles smaller than 1 μm may pass through said filter.

13. An apparatus as recited in claim 11, further comprising a storage tank to store the propellant, the propellant passing through said compressor.

14. An apparatus as recited in claim 13, wherein said compressor condenses the propellant before the propellant is stored in said storage tank.

15. An apparatus as recited in claim 7, said station further including a bore to receive the canisters and a piercing means that extends radially inwardly into said bore of said station.

16. An apparatus as recited in claim 15, wherein said piercing means comprises one of a hydraulic pin assembly, a star wheel assembly, and a wedged knife assembly.

17. An apparatus as recited in claim 7, wherein said at least one seal assembly includes a wiper seal to prevent blow back of the canisters.

18. An apparatus as recited in claim 7, wherein said at least one seal assembly includes a Teflon type seal.

19. An apparatus as recited in claim 7, wherein said station and said evacuation tank are disposed between a first seal block assembly and a second seal block assembly to isolate said station and said evacuation tank from the outside environment.

20. An apparatus as recited in claim 7, wherein said at least one seal block assembly includes a plurality of seal blocks.

21. An apparatus as recited in claim 20, wherein each of said seal blocks includes a bore to receive the canisters, a seal extending radially inwardly into said bore and adapted to engage an outer circumference of the canisters.

22. An apparatus as recited in claim 7, wherein said escapement track includes a top opening and a bottom opening, the canisters descending from said top opening to said bottom opening under the influence of gravity.

23. An apparatus as recited in claim 22, wherein a canister restriction device is disposed between said escapement track and said rotator to prevent interference with the operation of said rotator by a canister of said escapement track not within said bore of said rotator.

24. A pressurized canister recycling apparatus for use in recycling contents of a plurality of pressurized canisters, comprising:
    a hopper that holds and selectively releases the canisters;
    a rotator for receiving the canisters;

an escapement track that transfers the canisters released by said hopper and feeds the canisters to said rotator;

a ram that moves the canisters from said rotator;

a station for receiving canisters from said rotator, said station including piercing means for opening the canisters;

an evacuation tank that evacuates the contents of each of the canisters after the canisters have been opened by said piercing means;

a plurality of seal blocks that are adapted to isolate the canisters from an outside environment, wherein said station and said evacuation tank are disposed between two distinct seal block assemblies comprising said seal blocks;

a tank tap within said evacuation tank to draw the contents of the canisters from said evacuation tank;

a compressor to create a vacuum in said evacuation tank via said tank tap;

a filter disposed between said tank tap and said compressor, said compressor used to separate active ingredients of the canisters from propellant; and a storage tank to store the propellant.

25. An apparatus as recited in claim 24, wherein the propellant comprises Freon.

* * * * *